US009245191B2

(12) United States Patent
Bhardwaj et al.

(10) Patent No.: US 9,245,191 B2
(45) Date of Patent: Jan. 26, 2016

(54) SYSTEM AND METHOD FOR SCENE TEXT RECOGNITION

(71) Applicant: eBay, Inc., San Jose, CA (US)

(72) Inventors: Anurag Bhardwaj, Sunnyvale, CA (US); Chen-Yu Lee, San Diego, CA (US); Robinson Piramuthu, Oakland, CA (US); Vignesh Jagadeesh, Santa Clara, CA (US); Wei Di, San Jose, CA (US)

(73) Assignee: eBay, Inc., San Jose, CA (US)

( * ) Notice: Subject to any disclaimer, the term of this patent is extended or adjusted under 35 U.S.C. 154(b) by 0 days.

(21) Appl. No.: 14/479,217

(22) Filed: Sep. 5, 2014

(65) Prior Publication Data

US 2015/0063688 A1 Mar. 5, 2015

Related U.S. Application Data

(60) Provisional application No. 61/874,291, filed on Sep. 5, 2013.

(51) Int. Cl.
| | |
|---|---|
| *G06K 9/66* | (2006.01) |
| *G06K 9/18* | (2006.01) |
| *G06K 9/62* | (2006.01) |
| *G06K 9/46* | (2006.01) |

(52) U.S. Cl.
CPC ............. *G06K 9/18* (2013.01); *G06K 9/6231* (2013.01); *G06K 9/6267* (2013.01); *G06K 2009/4666* (2013.01)

(58) Field of Classification Search
CPC ..... G06K 9/18; G06K 9/6267; G06K 9/6231; G06K 2009/4666; G06T 11/60
See application file for complete search history.

(56) References Cited

U.S. PATENT DOCUMENTS

2009/0313239 A1* 12/2009 Wen .................. G06F 17/30256
1/1

OTHER PUBLICATIONS

Bissacco, A., et al., "PhotoOCR: Reading Text in Uncontrolled Conditions", 2013 IEEE International Conference on Computer Vision (ICCV) (2013), 785-792.

Chang, Yin-Wen, et al., "Feature Ranking Using Linear SVM", JMLR: Workshop and Conference Proceedings, 3, (2008), 53-64.

Chen, Xiangrong, et al., "Detecting and reading text in natural scenes", Proceedings of the 2004 IEEE Computer Society Conference on Computer Vision and Pattern Recognition, 2004. CVPR 2004, vol. 2, (2004), II-366-II-373.

Coates, A., et al., "Text Detection and Character Recognition in Scene Images with Unsupervised Feature Learning", 2011 International Conference on Document Analysis and Recognition (ICDAR), (2011), 440-445.

De Campos, T. E, et al., "Character recognition in natural images", Proceedings of the International Conference on Computer Vision Theory and Applications, Lisbon, Portugal, (Feb., 2009), 8 pgs.

(Continued)

*Primary Examiner* — Brian Le
(74) *Attorney, Agent, or Firm* — Schwegman Lundberg & Woessner, P.A.

(57) ABSTRACT

Apparatus and method for performing accurate text recognition of non-simplistic images (e.g., images with clutter backgrounds, lighting variations, font variations, non-standard perspectives, and the like) may employ a machine-learning approach to identify a discriminative feature set selected from among features computed for a plurality of irregularly positioned, sized, and/or shaped (e.g., randomly selected) image sub-regions.

20 Claims, 7 Drawing Sheets

(56) References Cited

OTHER PUBLICATIONS

Dollar, A., et al., "Feature Mining for Image Classification", 2011 International Conference on Document Analysis and Recognition (ICDAR), (2011), 440-445.
Dollar, P., et al., "Integral channel features", BMVC, 2009, (2009), 11 pgs.
Fan, Rong-En, et al., "LIBLINEAR: A Library for Large Linear Classification", The Journal of Machine Learning Research, 9, (Jun. 1, 2008), 1871-1874.
Fukushima, K., "Neocognitron: a self organizing neural network model for a mechanism of pattern recognition unaffected by shift in position", Biol Cybern., 36(4), (1980), 193-202.
Heeger, David J, et al., "Pyramid-based texture analysis/synthesis", SIGGRAPH '95 Proceedings of the 22nd Annual Conference on Computer Graphics and Interactive Techniques, (1995), 229-238.
Kita, K., et al., "Binarization of Color Characters in Scene Images Using k-means Clustering and Support Vector Machines", 2010 20th International Conference on Pattern Recognition (ICPR), (2010), 3183-3186.
Lee, Chen-Yu, et al., "Region-based Discriminative Feature Pooling for Scene Text Recognition", IEEE Transactions on Biomedical Engineering, (2014), 8 pgs.
Lucas, S. M, et al., "ICDAR 2003 robust reading competitions", Seventh International Conference on Document Analysis and Recognition, 2003. Proceedings., (2003), 682-687.
Malik, J., et al., "Preattentive texture discrimination with early vision mechanisms", J Opt Soc Am A., 7(5), (May 1990), 923-32.
Mishra, A., et al., "Scene text recognition using higher order language priors", Proceedings of British Machine Vision Conference (BMVC), (2012), 1-11.
Mishra, A., et al., "Top-down and bottom-up cues for scene text recognition", 2012 IEEE Conference on Computer Vision and Pattern Recognition (CVPR), (2012), 2687-2694.
Neumann, L., et al., "Real-time scene text localization and recognition", 2012 IEEE Conference on Computer Vision and Pattern Recognition (CVPR), (2012), 3538-3545.
Novikova, T., et al., "Large-Lexicon Attribute-Consistent Text Recognition in Natural Images", Computer Vision—ECCV 2012, Lecture Notes in Computer Science, vol. 7577, (2012), 752-765.
Puzicha, J., et al., "Non-parametric similarity measures for unsupervised texture segmentation and image retrieval", 1997 IEEE Computer Society Conference on Computer Vision and Pattern Recognition, 1997. Proceedings, (1997), 267-272.
Shahab, A., et al., "ICDAR 2011 Robust Reading Competition Challenge 2: Reading Text in Scene Images", 2011 International Conference on Document Analysis and Recognition (ICDAR), (2011), 1491-1496.
Shi, C., et al., "Scene Text Recognition Using Part-Based Tree-Structured Character Detection", 2013 IEEE Conference on Computer Vision and Pattern Recognition (CVPR), (2013), 2961-2968.
Smith, D. L, et al., "Enforcing similarity constraints with integer programming for better scene text recognition", 2011 IEEE Conference on Computer Vision and Pattern Recognition (CVPR), (2011), 73-80.
Tu, Zhuowen, "Probabilistic boosting-tree: learning discriminative models for classification, recognition, and clustering", Tenth IEEE International Conference on Computer Vision, 2005. ICCV 2005, vol. 2, (2005), 1589-1596.
Viola, P., et al., "Robust Real-time Object Detection", International Journal of Computer Vision, (2001), 1-25.
Wang, K., et al., "End-to-end scene text recognition", 2011 IEEE International Conference on Computer Vision (ICCV), (2011), 1457-1464.
Wang, Kai, et al., "Word Spotting in the Wild", Computer Vision—ECCV 2010, Lecture Notes in Computer Science, vol. 6311, (2010), 591-604.
Wang, T., et al., "End-to-end text recognition with convolutional neural networks", 2012 21st International Conference on Pattern Recognition (ICPR), (2012), 3304-3308.
Weinman, J. J, et al., "Toward Integrated Scene Text Reading", IEEE Transactions on Pattern Analysis and Machine Intelligence, 36(2), (Feb. 2014), 375-387.
Yao, B., et al., "Combining randomization and discrimination for fine-grained image categorization", 2011 IEEE Conference on Computer Vision and Pattern Recognition (CVPR), (2011), 1577-1584.
Yi, C., et al., "Feature Representations for Scene Text Character Recognition: A Comparative Study", 2013 12th International Conference on Document Analysis and Recognition (ICDAR), (2013), 907-911.
Zeng, C., et al., "An Algorithm for Colour-Based Natural Scene Text Segmentation", Camera-Based Document Analysis and Recognition, Lecture Notes in Computer Science, vol. 7139, (2012), 58-68.
Zhu, Q., et al., "Fast Human Detection Using a Cascade of Histograms of Oriented Gradients", 2006 IEEE Computer Society Conference on Computer Vision and Pattern Recognition, vol. 2, (2006), 1491-1498.

\* cited by examiner

SYSTEM AND METHOD FOR SCENE TEXT RECOGNITION

CLAIM OF PRIORITY

This application claims the benefit of priority to U.S. Provisional Patent Application Ser. No. 61/874,291, filed on Sep. 5, 2013, which is incorporated by reference herein in its entirety.

TECHNICAL FIELD

The present invention relates generally to computer vision, and more particularly to text recognition.

BACKGROUND

With the rapid growth in large collections of digital images and increasing capabilities for quickly and conveniently acquiring such images in natural settings, interest in developing efficient ways for extracting useful information from these images in an automated fashion is increasing as well. For example, the wide proliferation of mobile computing devices (such as smart phones) with integrated cameras and network (e.g., Internet) access gives rise to a desire for technologies that enable analyzing a picture of an object of interest—such as a product, building, etc.—on the fly to retrieve relevant information associated with the object (e.g., a product description, the name of the building, etc.). It will be evident that object-detection and -recognition capabilities have vast application potential in e-commerce, tourism, and other contexts.

Accordingly, much research has and is being done on computer-vision approaches for detecting and recognizing certain types of objects within images. Given the ubiquity of text objects (such as words, number, or symbols) in our environment, text-recognition is a task of particular importance. A number of text-recognition approaches that are successful in certain circumstances have been developed. For instance, commercially available optical character recognition (OCR) systems achieve high performance on text-containing images obtained, e.g., by scanning a page of a book or other printed medium, where text is typically displayed in constrained settings, e.g., on a uniform (typically white) background, in standard fonts, etc. However, these systems generally do not provide satisfactory performance on textual images acquired in natural settings, e.g., photos of bill boards, traffic signs, product labels, etc. Such images are often characterized by noisy backgrounds, perspective, irregular sizes and fonts, unusual aspect ratios, and so on, resulting in low classification performance (i.e., incorrectly identified text) and/or an impracticably high computational load. Accordingly, alternative text-recognition approaches that achieve higher performance particularly on images of text occurring in natural settings are desirable.

BRIEF DESCRIPTION OF THE DRAWINGS

Various embodiments are illustrated herein with reference to the accompanying drawings, in which.

DETAILED DESCRIPTION

Figure 1A:
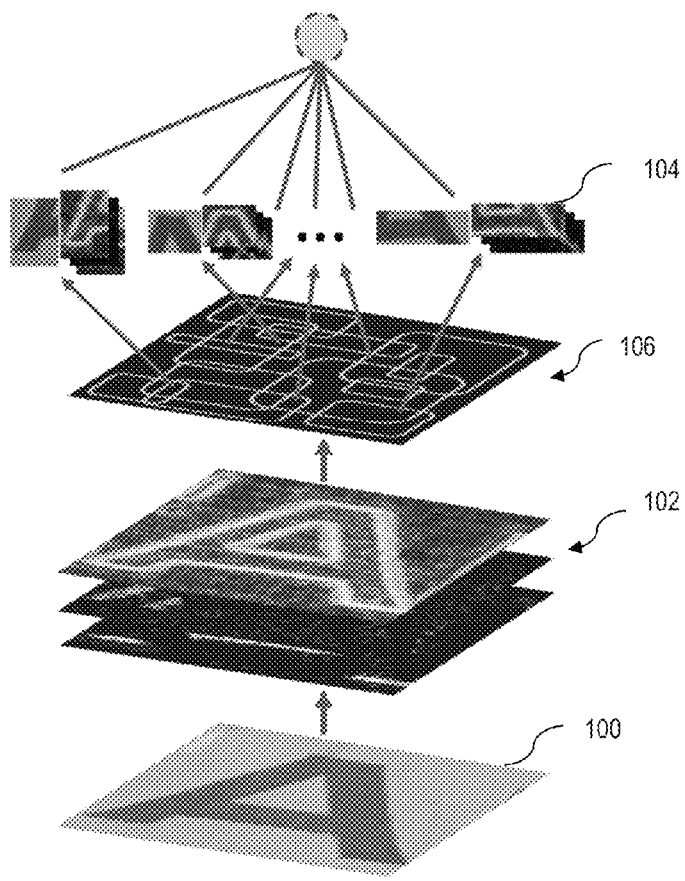
FIG. 1A illustrates region-based feature pooling in accordance with various embodiments.

Described herein are methods, systems, and apparatus for performing accurate text recognition of non-simplistic images. Various embodiments facilitate the accurate, efficient, and automatic detection and recognition of text present in images having clutter backgrounds, lighting variations, font variations, non-standard perspectives, and the like, hereinafter also referred to as "scene text." Such scene text recognition capability has applications in, without limitation, commerce, inventory management systems, or visual search systems by providing valuable and unique textual information directly from product images.

In the following description, example embodiments and numerous details are set forth for the purpose of explanation. However, various modifications to the example embodiments will be readily apparent to those skilled in the art, and the generic principles defined herein may be applied to other embodiments and applications, and practiced without the use of these specific details, without departing from the scope of the invention. Thus, the present disclosure is not intended to be limited to the embodiments shown, but is to be accorded the widest scope consistent with the principles and features disclosed herein. Furthermore, certain well-known structures and processes are omitted from the following description and accompanying drawings in order not to obscure the description of the invention with unnecessary detail.

Text recognition in accordance herewith generally involves the classification of individual characters extracted from scene text (hereinafter referred to as "scene characters") based on a set of discriminative features derived from the scene character image in conjunction with feature weights associated with all of the supported character classes. In various embodiments, the set of discriminative features is selected from a larger, random collection of features (or, more precisely, a discriminative feature space is determined within a larger feature space) using a machine-learning algorithm applied to a set of training images. The machine-learning algorithm also serves to determine the feature weights associated with the selected features. Once a discriminative feature space and associated feature weights for all supported character classes have been determined, weighted averages of the discriminative features computed for a scene character (i.e., features computed for all dimensions within the discriminative feature space) can be computed for all classes, and the class most closely matching the scene character can be identified based on a comparison of the weighted averages.

As used herein, a character class is "supported" in a particular embodiment if characters of that class can be recognized. Certain embodiments support 62 different character classes, including ten number digits and 52 English characters (both upper and lower case). The present disclosure is, however, not limited to this particular set of character classes;

rather, the approach disclosed herein is generally applicable to any arbitrary set of character classes, including, e.g., characters specific to other languages (such as Greek, Russian, Chinese, etc.) and special symbols (such as +, =, &, %, etc.). While example embodiments are herein illustrated with reference to English characters and number digits, it will be readily apparent to persons of skill in the art, from the following description, how to modify and/or extend the example embodiments to facilitate the detection and recognition of other types of characters.

A "feature," as used herein, is a (typically real) number aggregating a particular type of image information, such as a color, gray-scale, or gradient value, over a particular sub-region (i.e., a contiguous group of pixels or, in the extreme case, a single pixel) of the image region containing the character. Different features (corresponding to different sub-regions and/or different types of image information) generally vary in their usefulness for discriminating between different character classes; a feature or set of features is herein considered "discriminative" for a given character class if its usefulness for distinguishing between characters of that class and characters of other classes is high compared with other features or feature sets. The relative usefulness of different features for recognizing characters of a particular class may be captured in "feature weights" associated with the class, where higher weights generally correspond to more discriminative features. Different character classes generally vary in the feature sets that are discriminative of each class and, thus, in their associated feature weights.

In contrast to many conventional text or object recognition methods, which utilize features computed for a pre-defined, regular set of sub-regions of an image, such as the sub-regions defined by a uniform square grid, various embodiments hereof use features computed for irregularly sized and spaced sub-regions. For example, in some embodiments, the sub-regions are rectangular in shape, and their positions (e.g., the two-dimensional positions of their upper left corners within the image of the character), width, and height are randomly selected from, e.g., uniform distributions. In other embodiments, fewer, more, or different parameters of the sub-region may be variable and/or irregular. For instance, squares of different sizes and irregular positions, rectangles of equal areas but different aspect ratios, or non-rectangular (e.g., trapezoid, round, etc.) sub-regions may be used. By releasing constraints that are conventionally imposed on the sub-regions, e.g., by allowing varying sizes, aspect ratios, shapes, and/or irregular spacing and position, a greater initial feature space is made available, bearing the potential of identifying therein a discriminative feature (sub-)space providing higher discriminatory performance than a feature space constrained at the outset.

In various embodiments, features are computed for multiple "feature channels," i.e., multiple types of image information. Some embodiments utilize ten feature channels, including three color channels (corresponding, e.g., to the well-known LUV values), six gradient channels (corresponding to intensity gradients in six directions), and one gradient magnitude channel. For a given image (whether it be a training image used to identify a discriminatory feature space or a scene character image to be classified), features may be first calculated pixelwise for each feature channel, and the resulting low-level features may thereafter be aggregated across pixels within each sub-region to provide mid-level features. The machine-learning algorithm used to identify a discriminatory feature set operates on these mid-level features (the same ones for all training images), as does the character recognition algorithm used to classify scene characters based on a previously determined discriminatory feature set.

The foregoing will be more readily understood from the following more detailed description of example embodiments and the accompanying drawings. FIG. 1A conceptually illustrates feature aggregation (or "feature pooling") over randomly selected sub-regions of an input image 100, in the depicted example an image of the letter "A," in accordance with some embodiments. From the input image 100, which can be mathematically represented as a matrix I(xy), one or more images 102, each corresponding to a different feature channel, can be computed. These images 102 may be collectively represented as a feature channel set $C(x,y)=\{\Omega_1(I), \Omega_2(I), \ldots, \Omega_D(I)\}$, where D is the total number of channels and $\Omega_i(I)$ denotes a channel generation function over all pixels (x,y). Each channel function $\Omega_i$ generates a real-valued channel response for each individual pixel location (i.e., a low-level feature); accordingly, each image within the feature channel set has the same dimensions as the input image 100.

Figure 1B:
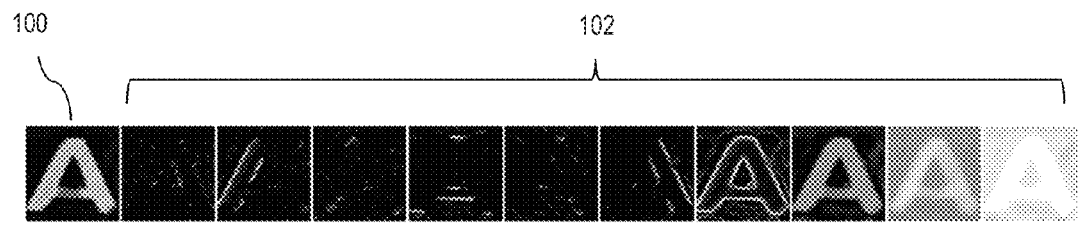
FIG. 1B illustrates different feature channels in accordance with various embodiments.

FIG. 1B shows a series of images, including the input image 100 (far left) and ten images 102 of a feature channel set C(x,y) with ten feature channels, in accordance with one embodiment. From left to right, the images 102 reflect six gradient histogram channels for six corresponding orientations at uniform angular spacings (0°, 30°, 60°, 90°, 120°, 150°), the gradient magnitude, and three LUV color channels; these ten feature channels are commonly referred to as "integral channel features." Of course, other types and numbers of feature channels may be used. For example, LUV color channels may be replaced with RGB color channels; or gradient histograms may be computed for fewer, more, or different orientations. In some embodiments, only a single channel, e.g., measuring the intensity or grayscale value of each pixel, is used.

With renewed reference to FIG. 1A, the low-level, pixel-wise features contained in the feature channel set C(x,y) (i.e., the set of images 102) are aggregated over sub-regions 104, also referred to as "templates," to form mid-level features. As shown at 106, the sub-regions 104 may be substantially rectangular regions of varying sizes and aspect ratios that are distributed substantially uniformly over the total area of the input image 100. Assuming an N×N image I(x,y) and denoting the sub-regions or templates $\tau_i$, where i runs from 1 to the total number T of templates, the rectangular sub-regions R can be parameterized by position $(x_i, y_i)$, width $w_i$, and height $h_i$, where $x_i$, $y_i$, $w_i$, and $h_i$ are each randomly sampled from a discrete uniform distribution U over N:

$$\tau_i = R(x_i, y_i, w_i, h_i) \text{ with } x_i, y_i, w_i, h_i \sim U(1, N)$$

If the random sampling of the four parameters results in a rectangle that falls partially outside the image N×N image region, this rectangle may be simply discarded, ensuring that all $\tau_i$ are wholly contained within the image region. Of course, the sub-regions may be selected in many alternative ways that still result in irregular positions, sizes, and/or shapes. In various embodiments, the original number of templates T is large (e.g., >1000 for an image including 256×256 pixels), but only a fraction (e.g., less than half or less than one third, or fewer) of the original templates are ultimately selected for character classification.

From the feature channel set C(x,y) and the set of sub-regions $\tau_i$, a first-order channel feature vector $\vec{s}_i$ can be computed for each sub-region $\tau_i$ by aggregating, for each channel, over the response values for all pixels with the sub-region $\tau_i$; the components of this vector are the mid-level feature for the sub-region i. In some embodiments, aggregating corresponds simply to summing (or, alternatively, averaging) over the response values for all pixels within the sub-region $\tau_i$ for each channel:

$$\vec{s}_i = \left[\sum_{x,y \in \tau_i} C_1(x, y), \sum_{x,y \in \tau_i} C_2(x, y), \ldots, \sum_{x,y \in \tau_i} C_D(x, y)\right].$$

(Averaging over the pixel values corresponds to summing over the pixel values and normalizing by the size of the sub-region, i.e., the number of pixels within the sub-region.) In other embodiments, the individual pixel values can be aggregated in more complex manners, for instance, by computing a weighted average of the pixel values in which the weight depends on the location of a pixel within the sub-region. In general, a mid-level feature for a sub-region is a function of the low-level features computed for all individual pixels within the sub-region. The first-order channel feature vectors $\vec{s}_i$ of all sub-regions $\tau_i$ may be concatenated, in a specified, fixed order, to form a feature vector $\vec{f} = [\vec{s}_1 \vec{s}_2 \ldots \vec{s}_T]^T$ for the image I as a whole.

Figure 2:
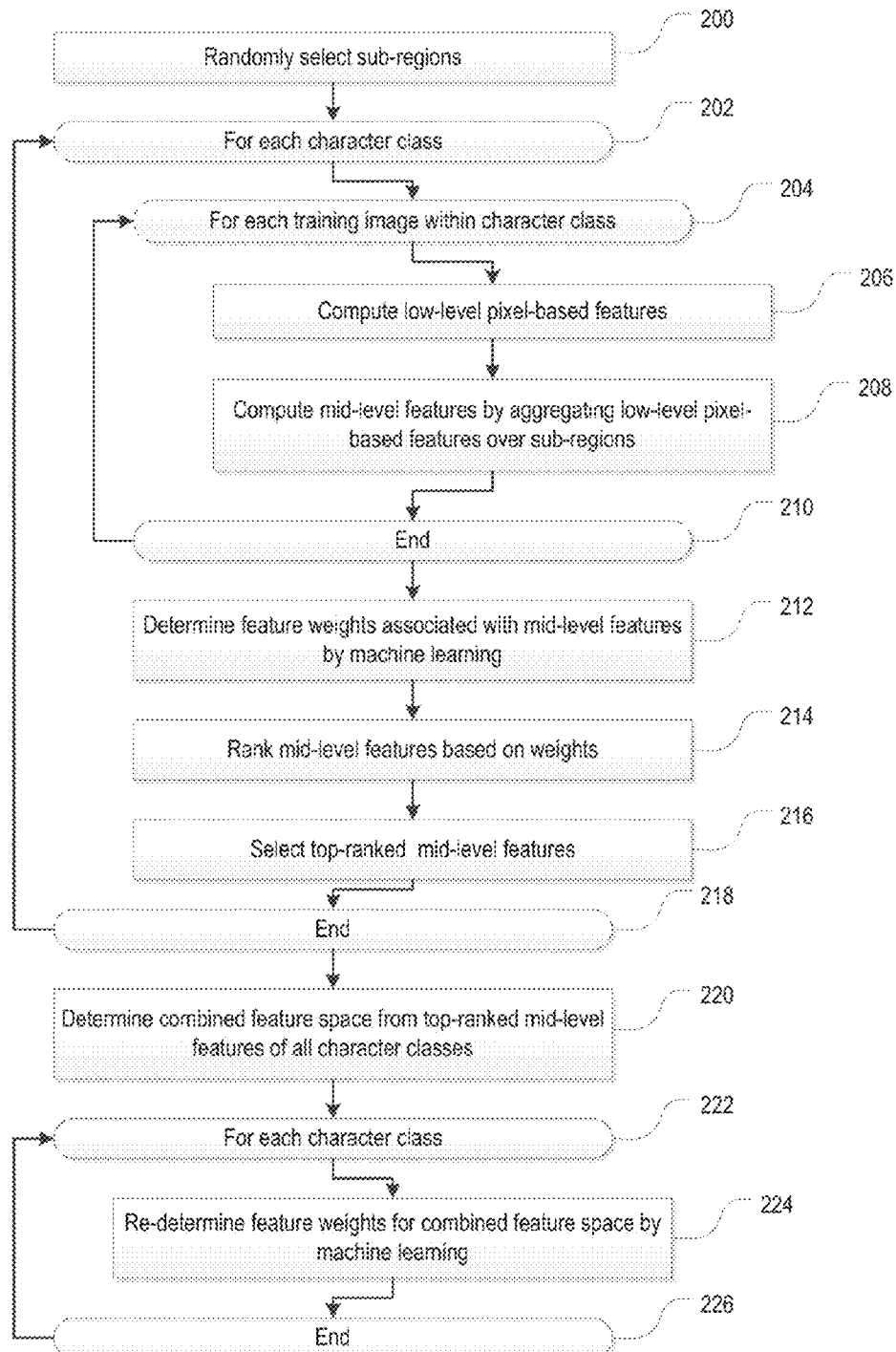
FIG. 2 is a flow chart illustrating methods for determining a discriminative feature space in accordance with various embodiments.

FIG. 2 illustrates, in the form of a flow chart, how feature pooling over randomly selected sub-regions in conjunction with machine learning can be used, in accordance with various embodiments, to determine a discriminative feature space for a plurality of character classes. The order of operations may, to some extent, vary from the depicted order, the latter being chosen to emphasize logical interrelations and dependencies between the various actions that constitute the overall method. The starting point of the method is a set of training images for all character classes that are to be supported. Several suitable collections of training images that cover the 52 English characters and ten number digits are publicly available; non-limiting examples include the Chars74K, ICDAR03, ICDAR11 Robust Reading Competition, and Street View Text (SVT) datasets. To achieve a canonical size across all training images (e.g., in some embodiments, 24×24 pixels), the images may be resized if necessary. The dataset(s) may be split into training images, which are used to train the character recognition algorithm (e.g., in accordance with FIG. 2), and testing images, which may thereafter be used to assess the performance of the trained algorithm (see FIG. 3). Further, the plurality of training images may be split into multiple sets for the different character classes. The training image set for each individual class, in turn, may include images of characters belonging to that class (called "positive" instances) as well as, for comparison and contrast, images of characters not belonging to that class (called "negative" instances). Distinguishing between positive and negative instances is, of course, based on a-priori knowledge of the class association, which may be obtained, e.g., by a having a human label each character image. While labeled training images simplify the learning algorithm, they are not strictly necessary, as labels can, in principle, be learned automatically with a suitable unsupervised learning algorithm.

As shown in FIG. 2, a method for determining a discriminative feature space in involves randomly selecting, or otherwise defining, a plurality of irregularly sized, shaped, and/or positioned sub-regions (200), e.g., in a manner as described above. Further, the method involves, for each character class (202) and for each training image with a character class (204), computing low-level, pixel-based features (for one or more feature channels) (206), and aggregating the low-level features over the sub-regions to compute mid-level features (208), e.g., as described above. As will be readily apparent to those of ordinary skill in the art, the computation of low-level features (206) may precede the selection of the sub-regions (200) since it is independent of the sub-regions. For example, in some embodiments, low-level features may first be computed for all training images, and the sub-regions may thereafter be defined to facilitate the computation of the mid-level features. Alternatively, as another example, the low-level and mid-level features may be computed sequentially for all training images, and the sub-regions may be selected when they are needed for the first time, i.e., just prior to computing the mid-level features for the first training image, and may be re-used during subsequent determinations of the mid-level features for other images.

In embodiments that use rectangular sub-regions, the computation of the mid-level features may be accomplished in two steps: First, integral features may be computed for each channel and for all rectangular regions beginning at the upper left corner of the image, according to:

$$CC_j(x, y) = \sum_{x' < x, y' < y} C_j(x', y') \text{ where } j = 1, \ldots, D.$$

This equation can be easily implemented, e.g., in Matlab (a high-level computing language particularly suitable for implementing mathematical operations and algorithm, available from MathWorks, Inc., Natick, Mass.), using a single line of code: "CC=cumsum(cumsum(C),2);". From these integral features, the $j^{th}$ entry in the first-order channel feature vector $\vec{s}_i$ can be computed efficiently with only three linear algebraic operations:

$$\vec{s}_i(j) = \sum_{x,y \in \tau_i} C_j(x, y) =$$
$$CC_j(x_i, y_i) + CC_j(x_i + w_i, y_i + h_i) - CC_j(x_i + w_i, y_i) - CC_j(x_i, y_i + h_i)$$

With renewed reference to FIG. 2, once the mid-level features for all training images within a character class have been computed (i.e., following 210), a machine-learning algorithm may be applied to the feature vectors $\vec{f} = [\vec{s}_1 \vec{s}_2 \ldots \vec{s}_T]^T = [f_1 f_2 \ldots f_d]$ within the d-dimensional feature space (d=D×T) to determine feature weights associated with the character class (212). Suitable machine-learning algorithms (including both supervised algorithms, which operate on labeled training images, and unsupervised algorithms, which do not require labels) are well-known to those of ordinary skill in the art, and can be implemented without undue experimentation; example algorithms include boosting, random forests, neural networks, and other supervised learning algorithms. The machine-learning algorithm generally serves to automatically discover meaningful, discriminatory spatial features for each character class.

In some embodiments, a support vector machine (SVM) with a linear kernel is used; SVMs are well-known to those of ordinary skill in the art (see, e.g., C. Cortez et al., "Support-vector networks" in Machine Learning 20(3): 273 (1995)). The SVM determines, based on the feature vectors $\vec{f} = [f_1 f_2 \ldots f_d]$ for all the training images within the class, a feature weight vector $\vec{\omega} = [\omega_1 \omega_2 \ldots \omega_d]$. Given a trained feature vector $\vec{\omega}$ for a given class and a feature vector $\vec{f}$ for a particular image, the determination whether the image belongs to the class can be made using a decision function $l(\vec{f})=\text{sgn}(\vec{\omega}^T\vec{f}+b)$, where "sgn" is a function that determines whether the quantity in brackets is positive or negative, and b is an adjustable off-set. With well-trained feature weights and a suitable off-set b, the sign is positive for most (or all) feature vectors of images that fall within the character class and negative for most (or all) feature vectors of images that do not fall within the class. The feature weight vector $\vec{\omega}$ may be geometrically interpreted as the normal vector of the hyperplane within the feature space that best separates positive from negative instances. Since the final decision value $l(\vec{f})$ is a weighted linear combination of the features, it is apparent that the bigger the value of a weight $\omega_1$, the more the corresponding feature $f_1$ contributes to the final decision value; therefore, the weights indicate the relative importance of the various features to the final decision. The decision function may be modified and/or generalized in various ways; for example, instead of computing the straightforward scalar product between the feature vector and the feature weight vector, the scalar product between the feature weight vector and a function $\phi(\vec{f})$ may be used.

In order to select, from among the large number of (mid-level) features originally calculated, a set of discriminative features for a given class, the mid-level features may be re-arranged in the order of their relative importance based on the calculated feature weights (larger weights corresponding to more important features) (214), and a specified number of the higher-ranking features may then be selected for subsequent use (216). Specifically, for class in, the features may be ranked, $$f_{rank}^m = \{\hat{f}_1^m, \hat{f}_2^m, \ldots, \hat{f}_d^m\},$$

such that $|\omega_i^m(\hat{f}_i^m)| \geq \omega_j^m(\hat{f}_j^m)|$ for $i<j$. From the ranked list, the K top-level features may be selected:

$$f_{select}^m = \{\hat{f}_t^m, t \leq K\}.$$

In some embodiments, the K top-level features are selected by (e.g., five) repeated trials, each using only a subset of the training images, to allow for (e.g., five-fold) cross-validation. The value of K may be chosen manually or automatically based, e.g., on a pre-set threshold for the product of feature vectors and weight vectors that is to be exceeded to achieve satisfactory performance.

Once features have been ranked and selected for all supported character classes (i.e., following 218), the union of the top K features across all M classes may be formed (220):

$$F = \bigcup_{m=1:M} f_{select}^m.$$

Note that the top K features of the various classes may overlap; thus, the total number of features is often less than K×M. Further note that, as described above, each feature corresponds to a combination of a particular sub-region and a particular feature channel; thus, the union set F may contain, for a certain sub-region, a feature for one channel but omit the feature for another channel. In some embodiments, the selected features are augmented such that, for each sub-region contributing to the discriminative feature space at all, features for all channels are included; in this case, the feature selection effectively results in a selection of sub-regions (from among the initially large set of T sub-regions) that contain relevant information for discriminating between character classes. The union set F (whether augmented as described or not) corresponds to a discriminative feature space; this feature space may subsequently be used to classify scene characters, as described in detail with respect to FIG. 3.

In addition to determining the discriminative feature space, actions 200-220 yield class-specific feature weights. These weights, which were originally computed (at 212) for individual character classes and used to rank the features in accordance with their relative importance, may in principle also be employed to compute the decision function value for a scene character image to be classified. In some embodiments, however, the feature weights are re-computed (224) for each character class (222-226) once the discriminative feature space has been fixed, typically (but not necessarily) using the same machine-learning algorithm (e.g., SVM) a was used previously. Re-computing the feature weights may result in increased classification performance.

Figure 3:
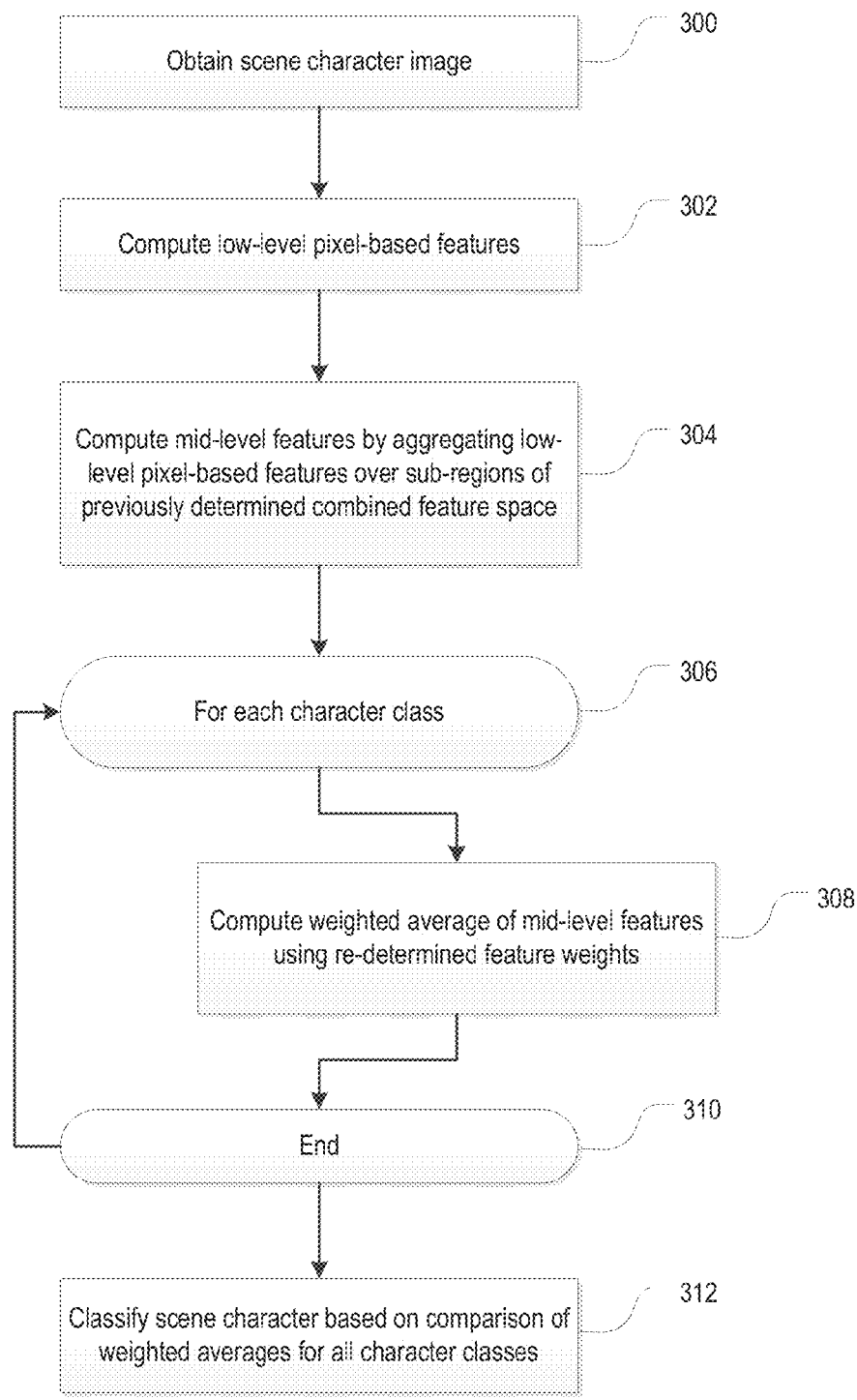
FIG. 3 is a flow chart illustrating methods for classifying scene characters based on discriminative features in accordance with various embodiments.

Refer now to FIG. 3, which illustrates a method for classifying a scene character using the discriminative feature space and feature weights determined in the method illustrated in FIG. 2. A scene character image may first be obtained (300), e.g., by extracting a portion corresponding to an individual character from a larger text-containing image and rescaling the image to the canonical size. In various embodiments, the isolation of an individual character from the text is accomplished inherently by the trained character-recognition algorithm itself, which may be applied to portions of the text-containing image in a sliding-window fashion. Recognizing words or text as such in images may, in turn, be accomplished using a conventional text-detection approach, such as, e.g., the PLEX word-spotting algorithm, which is described in a publication by K. Wang et al., entitled "End-to-end scene text recognition" (ICCV, 2011), the entire disclosure of which is incorporated herein by reference. Other text-detection algorithms are described, e.g., by L. Neumann et al. in "Real-time scene text localization and recognition" (Computer Vision and Pattern Recognition (CVPR), 2012, IEEE Conference) and by T. Wang et al. in "End-to-end text recognition with convolutional neural networks" (Pattern Recognition (ICPR), 2012, 21$^{st}$ International Conference IEEE), which are also incorporated herein by reference in their entireties. The image portion corresponding to an individual character may, optionally, be pre-processed, e.g., to filter out noise, enhance the image contrast, etc.

From the properly sized scene character image, low-level features may be computed (302) and aggregated over the sub-regions of the (previously determined) discriminative feature space to form mid-level features (304); these actions can generally be performed in the same manner as used during the training phase. Then, for each character class (306), a weighted average of the mid-level features may be computed using the feature weights associated with the particular class (308). In other words, a scalar product of the feature vector derived from the scene character image with the feature weight vector for the class (or a function $\phi$ thereof, as mentioned above) may be computed. Once the weighted averages have been computed for all supported character classes (i.e., following 310), they may be compared with each other to identify the largest weighted average, which corresponds to the best-matching character class (312). Alternatively, in accordance with some embodiments, a decision function $l(\vec{f})$ may be applied to the product of the feature vector $\vec{f}$ (computed within the discriminative feature space, i.e., a sub-space of the original feature space used during the training phase) and the feature weight vector omega for a particular class, whether the scene character belongs to that class; if the answer is positive (with a sufficient level of statistical confidence), the computation of weighted averages for the remaining classes is no longer necessary.

Figure 4:
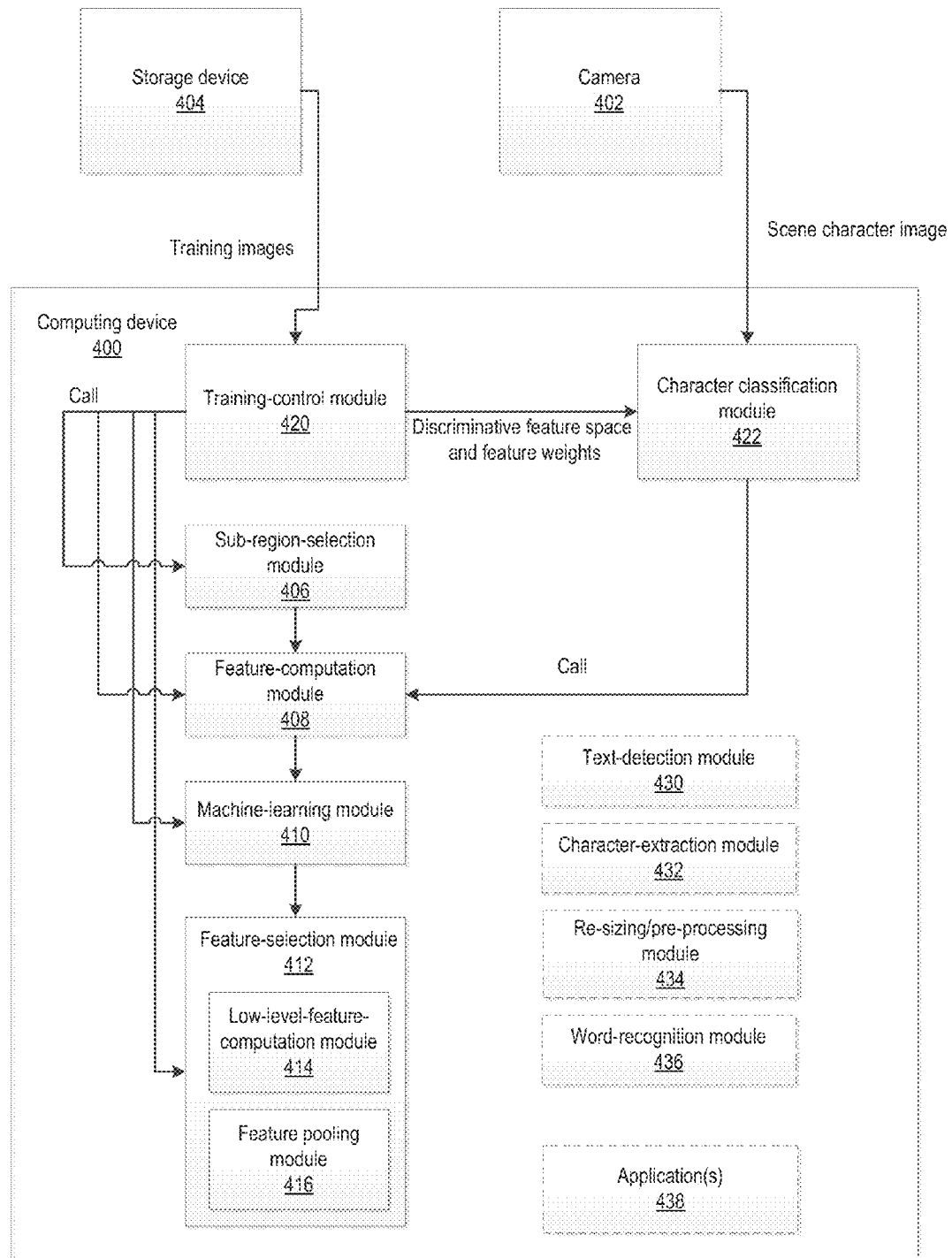
FIG. 4 is a block diagram illustrating various functional modules of a system for implementing the methods of FIGS. 2 and 3 in accordance with various embodiments.

The methods described herein can generally be implemented in hardware, software, or any suitable combination thereof, including, e.g., with a suitably programmed general-purpose computer, a special-purpose computer (e.g., a digital signal processor, programmable gate-array, etc.), or dedicated hardwired circuitry. FIG. 4 illustrates an example architecture including a number of functional modules of a suitable computing device 400. The device 400 may be integrated or in communication with image-acquisition hardware, such as a camera 402, which may supply images to be processed by the various modules. Alternatively or additionally, the device 400 may receive digital images from a digital storage device 404 (such as a hard drive, disk, USB memory key, etc.).

The device 400 may include a number of modules configured to execute discrete computational tasks associated with the performance of the methods of FIGS. 2 and 3. These modules may include, for example, a sub-region-selection module 406 configured to define a plurality of irregularly sized and positioned sub-regions within an image region (which may, e.g., utilize a random-number-generator function to randomly select the positions, width and height of the sub-regions); a feature-computation module 408 configured to compute mid-level features from an input image; a machine-learning module 410 implementing a suitable algorithm (e.g., SVM) to determine feature weights for each class that can be used to decide whether a particular image (as characterized by certain features computed therefrom) belongs to that class; and a feature-selection module 412 configured to rank features for each class based on the feature weights and select the top-ranked features for inclusion in a discriminative feature space. Some or all of these modules may include sub-modules. For instance, the feature-computation module 408 may include a low-level-feature-computation module 414 that can be used to compute low-level features for the individual pixels of an image, and a feature-pooling module 416 that can aggregate (e.g., sum) the low-level features over a sub-region to compute mid-level features. As another example, the feature-selection module may include separate sub-modules for ranking features and for selecting the top-level features based on a specified (e.g., user-supplied or programmatically fixed) number.

In addition to modules implementing certain discrete functions (e.g., modules 406, 408, 410, 412), the device 400 may include one or more modules that control and organize the operations and interactions of the other modules to implement the character-recognition methods described herein as a whole. For example, the device 400 may include a training-control module 420 that takes training sets for all supported character classes as input and calls the sub-region-selection, feature-computation, machine-learning, and feature-selection modules 406, 408, 410, 412 as needed to determine a discriminative feature space and feature weight vectors associated with all of the classes. More specifically, the training-control module may cause the feature-computation module 408 to cause mid-level features for each of the training images for all sub-regions. Further, it may cause the machine-learning module 410 to apply the implemented learning algorithm separately to each set of training images (each set corresponding to a character class) to first compute feature weights for all of the mid-level features, and, following the determination of a discriminative set of mid-level features across the classes, to re-compute the feature weights for the discriminative features (again separately for each class).

A character classification module 422 may receive, as inputs, an individual scene character image (e.g., from the camera 402) as well as the discriminative feature space and feature weights determined at the direction of the training-control module 420. It may call the feature-computation module 408 to compute mid-level features from the scene character image within the discriminative feature space, and may then computed weighted averages of these mid-level features with the feature weights for the various classes, and identify the largest weighted average to ascertain the best-matching character class. The device 400 may include further modules, e.g., a module 430 for detecting text in images, a module 432 for extracting individual characters from the text, a module 434 for resizing and/or otherwise pre-processing the character image prior to classification, a text-recognition module 436 that recognizes words based on the individually classified characters (e.g., in conjunction with a dictionary and/or statistical language models that can address errors and uncertainties in the individual character classification), and/or one or more application programs 438 that utilize the text-recognition functionality of the other modules. Of course, the functionality described herein can be organized in many different ways, and grouped into fewer, more, or different modules than depicted, as will be readily apparent to one of ordinary skill in the art. Further, the device 400 may be implemented in many different ways, e.g., as (or on) a desktop computer, laptop computer, tablet, smart phone, etc. More detail regarding example hardware and software architectures is provided below with respect to FIGS. 5-7.

In various embodiments, scene recognition methods and systems in accordance herewith improve character-classification accuracy, compared with various other text-recognition approaches. For example, in one embodiment, the method described herein, implemented with an L2-regularized SVM (as known to those of ordinary skill in the art) and weight retraining following feature selection, achieves 79% accuracy in a 62-way character classification, compared with only 62% accuracy achieved by the conventional AdaBoost approach. According to tests performed on the publicly available Chars74K-15 and ICDAR03-CH datasets, various implementations of the method proposed herein also outperform certain combinations of the histogram-of-gradients (HOG), Ferns, multiple-kernel-learning (MKL), and other computer-vision approaches as described in C. Yi et al., "Feature representations for scene text character recognition" (ICDAR 2013), K. Wang et al., "End-to-end scene text recognition" (ICCV 2011), and T. E. de Campos et al., "Character recognition in natural images" (ICCVTA 2009). (Note that various embodiments falling within the scope of the inventive subject matter may differ in their respective performance, depending, e.g., on the particular machine-learning algorithm employed, the types of sub-regions defined, and on whether weights are re-computed following selection of a discriminative feature space. Accordingly, observations that one embodiment hereof outperforms certain conventional character-recognition methods does not necessarily mean that all other embodiments do so as well.)

In addition to achieving, in some embodiments, higher classification accuracy, the method described herein may also benefit from a smaller discriminative feature space, which reduces computation time at the testing stage. Further, as compared with the well-known HOG approach employed in many conventional text-recognition systems, where HOG features are extracted based on a sliding window, various embodiments of the method described herein involve computing low-level features for an input image, as well as integral features for all rectangular regions beginning at the upper left corner of the image, only once, and thereafter performing feature pooling in the discriminative sub-regions in linear time (i.e., with a substantially constant lookup time per sub-region), yielding significant savings in computation time.

Practical applications of the systems and methods described herein are numerous. For example, in commerce, recognizing text that occurs as part of a product title, description, logo, or other associated information may enrich visual search systems by providing unique and valuable textual information directly from product images. An automated scene text reader may also help to bridge the gap between offline and online commerce, and serve as a fundamental component to enable visual search for seamless e-shopping. Text recognition in accordance herewith may also be employed in road-sign (including, e.g., traffic-sign) detection, roadside mapping (e.g., the mapping of attractions, restaurants, shopping facilities, etc. based on images taken along roads), and other traffic-related applications. Yet another application context is robotics, where text-recognition capabilities in accordance herewith may be used, e.g., to control robot behavior based on text encountered by the robot. Additional applications will occur to those of ordinary skill in the art.

Modules, Components, and Logic

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or with any suitable combination thereof. For example, a hardware module may include dedicated circuitry or logic that is permanently configured to perform certain operations. For example, a hardware module may be a special-purpose processor, such as a field-programmable gate array (FPGA) or an Application Specific Integrated Circuit (ASIC). A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Software Architecture

Figure 5:
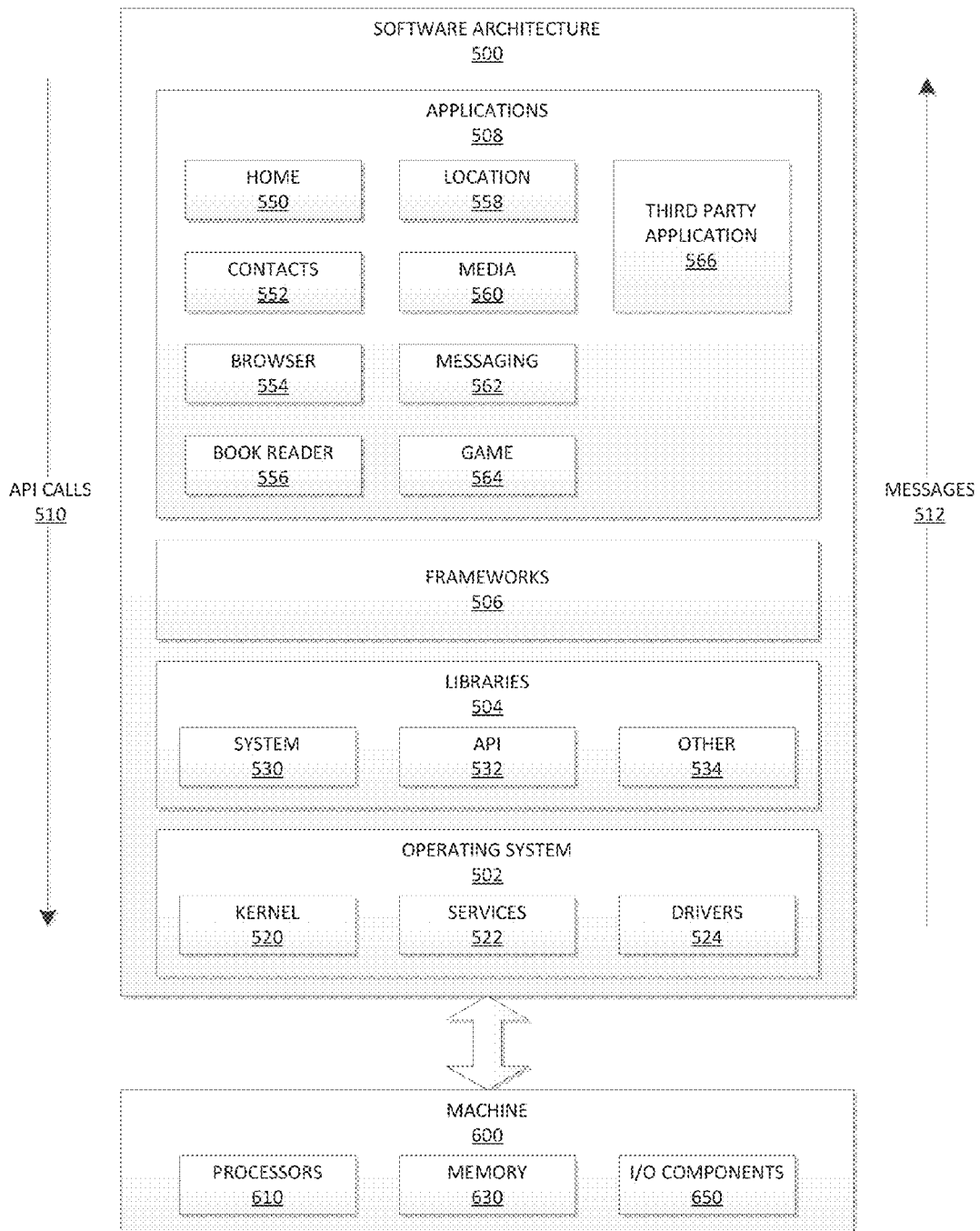
FIG. 5 is a block diagram illustrating an example software architecture in accordance with various embodiments.

FIG. 5 is a block diagram illustrating an architecture of software 500 implementing the methods described herein. FIG. 5 is merely a non-limiting example of a software architecture and it will be appreciated that many other architectures may be implemented to facilitate the functionality described herein. The software 500 may be executing on hardware such as a machine 600 of FIG. 6 that includes processors 610, memory 630, and I/O components 650. In the example architecture of FIG. 5, the software 500 may be conceptualized as a stack of layers where each layer may provide particular functionality. For example, the software 500 may include layers such as an operating system 502, libraries 504, frameworks 506, and applications 508. Operationally, the applications 508 may invoke application programming interface (API) calls 510 through the software stack and receive messages 512 in response to the API calls 510.

The operating system 502 may manage hardware resources and provide common services. The operating system 502 may include, for example, a kernel 520, services 522, and drivers 524. The kernel 520 may act as an abstraction layer between the hardware and the other software layers. For example, the kernel 520 may be responsible for memory management, processor management (e.g., scheduling), component management, networking, security settings, and so on. The services 522 may provide other common services for the other software layers. The drivers 524 may be responsible for controlling and/or interfacing with the underlying hardware. For instance, the drivers 524 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth.

The libraries 504 may provide a low-level common infrastructure that may be utilized by the applications 508. The libraries 504 may include system libraries 530 (e.g., C standard library) that may provide functions such as memory allocation functions, string manipulation functions, mathematic functions, and the like. In addition, the libraries 504 may include API libraries 532 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 504 may also include a wide variety of other libraries 534 to provide many other APIs to the applications 508.

The frameworks 506 may provide a high-level common infrastructure that may be utilized by the applications 508. For example, the frameworks 506 may provide various graphic user interface (GUI) functions, high-level resource management, high-level location services, and so forth. The frameworks 506 may provide a broad spectrum of other APIs that may be utilized by the applications 508, some of which may be specific to a particular operating system or platform.

The applications 508 may include a home application 550, a contacts application 552, a browser application 554, a book reader application 556, a location application 558, a media application 560, a messaging application 562, a game application 564, and a broad assortment of other applications such as a third-party application 566. In a specific example, the third-party application 566 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third-party application 566 may invoke the API calls 510 provided by the operating system to facilitate functionality described herein.

Example Machine Architecture and Machine-Readable Medium

Figure 6:
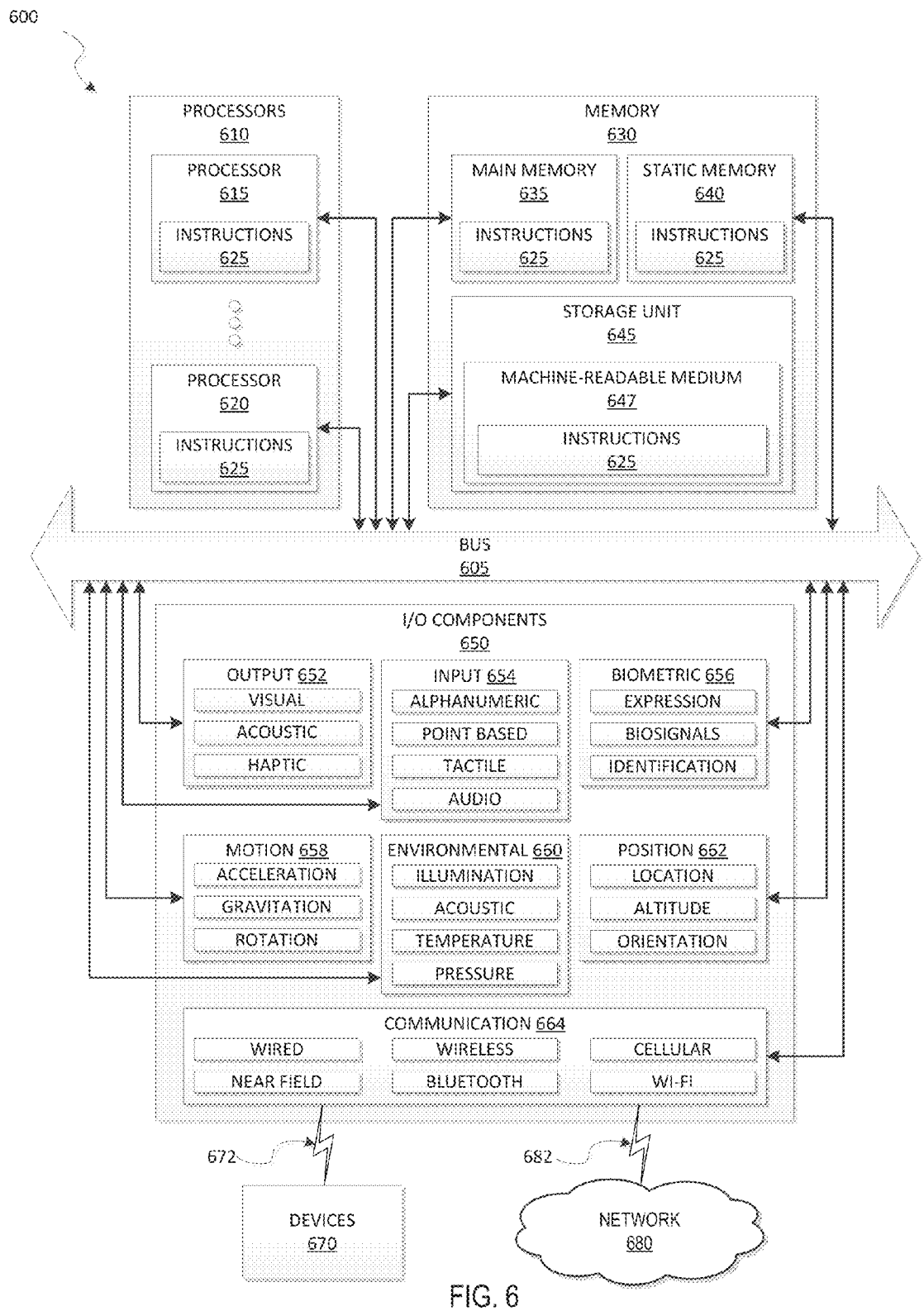
FIG. 6 is a block diagram illustrating an example computer system in accordance with various embodiments.

FIG. 6 is a block diagram illustrating components of a machine 600, according to some example embodiments, able to read instructions from a machine-readable medium (e.g., a machine-readable storage medium) and perform any one or more of the methodologies discussed herein. Specifically, FIG. 6 shows a diagrammatic representation of the machine 600 in the example form of a computer system, within which instructions 625 (e.g., software, a program, an application, an applet, an app, or other executable code) for causing the machine 600 to perform any one or more of the methodologies discussed herein may be executed. In alternative embodiments, the machine 600 operates as a standalone device or may be coupled (e.g., networked) to other machines. In a networked deployment, the machine 600 may operate in the capacity of a server machine or a client machine in a server-client network environment, or as a peer machine in a peer-to-peer (or distributed) network environment. The machine 600 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 625, sequentially or otherwise, that specify actions to be taken by the machine 600. Further, while only a single machine 600 is illustrated, the term "machine" shall also be taken to include a collection of machines 600 that individually or jointly execute the instructions 625 to perform any one or more of the methodologies discussed herein.

The machine 600 may include processors 610, memory 630, and I/O components 650, which may be configured to communicate with each other via a bus 605. In an example embodiment, the processors 610 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 615 and a processor 620 that may execute the instructions 625. The term "processor" is intended to include multi-core processor that may comprise two or more independent processors (also referred to as "cores") that may execute instructions contemporaneously. Although FIG. 6 shows multiple processors 610, the machine 600 may include a single processor with a single core, a single processor with multiple cores (e.g., a multi-core processor), multiple processors with a single core, multiple processors with multiples cores, or any combination thereof.

The memory 630 may include a main memory 635, a static memory 640, and a storage unit 645 accessible to the processors 610 via the bus 605. The storage unit 645 may include a machine-readable medium 647 on which is stored the instructions 625 embodying any one or more of the methodologies or functions described herein. The instructions 625 may also reside, completely or at least partially, within the main memory 635, within the static memory 640, within at least one of the processors 610 (e.g., within a processor's cache memory), or any suitable combination thereof, during execution thereof by the machine 600. Accordingly, the main memory 635, the static memory 640, and the processors 610 may be considered machine-readable media 647.

As used herein, the term "memory" refers to a machine-readable medium 647 able to store data temporarily or permanently, and may be taken to include, but not be limited to, random-access memory (RAM), read-only memory (ROM), buffer memory, flash memory, and cache memory. While the machine-readable medium 647 is shown in an example embodiment to be a single medium, the term "machine-readable medium" should be taken to include a single medium or multiple media (e.g., a centralized or distributed database, or associated caches and servers) able to store the instructions 625. The term "machine-readable medium" shall also be taken to include any medium, or combination of multiple media, that is capable of storing instructions (e.g., instructions 625) for execution by a machine (e.g., machine 600), such that the instructions, when executed by one or more processors of the machine 600 (e.g., processors 610), cause the machine 600 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., Erasable Programmable Read-Only Memory (EPROM)), or any suitable combination thereof. The term "machine-readable medium" specifically excludes non-statutory signals per se.

The I/O components 650 may include a wide variety of components to receive input, provide and/or produce output, transmit information, exchange information, capture measurements, and so on. It will be appreciated that the I/O components 650 may include many other components that are not shown in FIG. 6. In various example embodiments, the I/O components 650 may include output components 652 and/or input components 654. The output components 652 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 654 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, and/or other pointing instruments), tactile input components (e.g., a physical button, a touch screen that provides location and force of touches or touch gestures, and/or other tactile input components), audio input components (e.g., a microphone), and the like.

In further example embodiments, the I/O components 650 may include biometric components 656, motion components 658, environmental components 660, and/or position components 662 among a wide array of other components. For example, the biometric components 656 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 658 may include acceleration sensor components (e.g., accelerometer), gravitation sensor components, rotation sensor components (e.g., gyroscope), and so forth. The environmental components 660 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), and/or other components that may provide indications, measurements, and/or signals corresponding to a surrounding physical environment. The position components 662 may include location sensor components (e.g., a Global Position System (GPS) receiver component), altitude sensor components (e.g., altimeters and/or barometers that detect air pressure from which altitude may be derived), orientation sensor components (e.g., magnetometers), and the like.

Communication may be implemented using a wide variety of technologies. The I/O components 650 may include communication components 664 operable to couple the machine 600 to a network 680 and/or devices 670 via coupling 682 and coupling 672 respectively. For example, the communication components 664 may include a network interface component or other suitable device to interface with the network 680. In further examples, communication components 664 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 670 may be another machine and/or any of a wide variety of peripheral devices (e.g., a peripheral device coupled via a Universal Serial Bus (USB)).

Moreover, the communication components 664 may detect identifiers and/or include components operable to detect identifiers. For example, the communication components 664 may include Radio Frequency Identification (RFID) tag reader components, NFC smart tag detection components, optical reader components (e.g., an optical sensor to detect one-dimensional bar codes such as Universal Product Code (UPC) bar codes, multi-dimensional bar codes such as Quick Response (QR) codes, Aztec codes, Data Matrix, Dataglyph, MaxiCode, PDF417, Ultra Code, UCC RSS-2D bar codes, and other optical codes), acoustic detection components (e.g., microphones to identify tagged audio signals), and so on. In additional, a variety of information may be derived via the communication components 664, such as location via Internet Protocol (IP) geo-location, location via Wi-Fi® signal triangulation, location via detecting an NFC beacon signal that may indicate a particular location, and so forth.

Transmission Medium

In various example embodiments, one or more portions of the network 680 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 680 or a portion of the network 680 may include a wireless or cellular network and the coupling 682 may be a Code Division Multiple Access (CDMA) connection, a Global System for Mobile communications (GSM) connection, or another type of cellular or wireless coupling. In this example, the coupling 682 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 625 may be transmitted and/or received over the network 680 using a transmission medium via a network interface device (e.g., a network interface component included in the communication components 664) and utilizing any one of a number of well-known transfer protocols (e.g., hypertext transfer protocol (HTTP)). Similarly, the instructions 625 may be transmitted and/or received using a transmission medium via the coupling 672 (e.g., a peer-to-peer coupling) to the devices 670. The term "transmission medium" shall be taken to include any intangible medium that is capable of storing, encoding, or carrying instructions 625 for execution by the machine 600, and includes digital or analog communications signals or other intangible media to facilitate communication of such software.

Furthermore, the machine-readable medium 647 is non-transitory (in other words, not having any transitory signals) in that it does not embody a propagating signal. However, labeling the machine-readable medium 647 "non-transitory" should not be construed to mean that the medium is incapable of movement; the medium should be considered as being transportable from one physical location to another. Additionally, since the machine-readable medium 647 is tangible, the medium 647 may be considered to be a machine-readable device.

Applications

Figure 7:
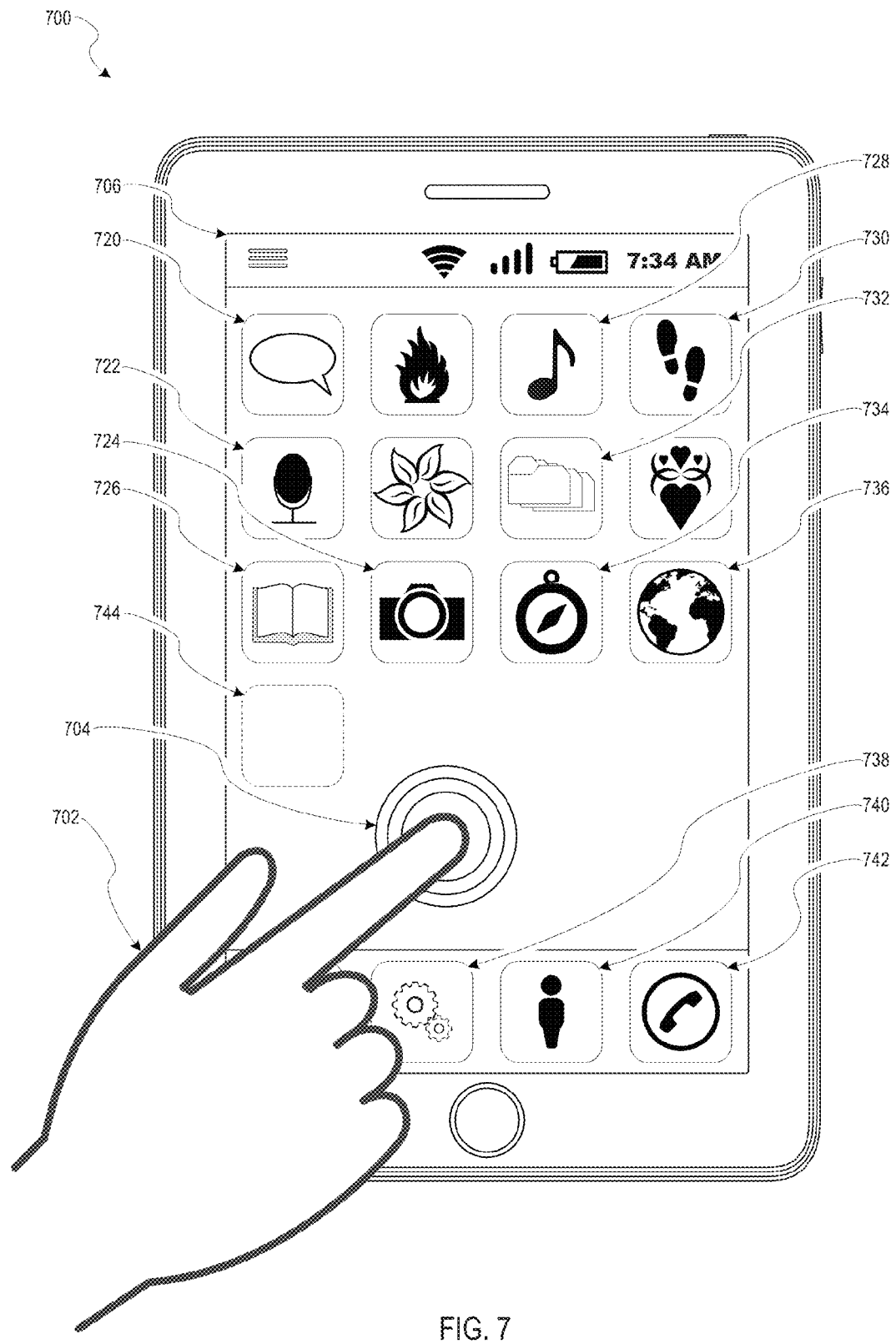
FIG. 7 depicts a smart phone in which text-recognition methods in accordance herewith may be implemented, in accordance with various embodiments.

FIG. 7 illustrates an example mobile device 700 that may be running a mobile operating system (e.g., iOS™, Android™, Windows® Phone, or other mobile operating systems), according to example embodiments. In an example embodiment, the mobile device 700 may include a touch screen that may receive tactile information from a user 702. For instance, the user 702 may physically touch 704 the mobile device 700 and in response to the touch 704 the mobile device 700 may determine tactile information such as touch location, touch force, gesture motion, and so forth. In various example embodiment, the mobile device 700 may display home screen 706 (e.g., Springboard on iOS™) that the user 702 of the mobile device 700 may use to launch applications and otherwise manage the mobile device 700. In various example embodiments, the home screen 706 may provide status information such as battery life, connectivity, or other hardware status. The home screen 706 may also include a plurality of icons that may be activated to launch applications, for example, by touching the area occupied by the icon. Similarly, other user interface elements may be activated by touching an area occupied by a particular user interface element. In this manner, the user 702 may interact with the applications.

A broad spectrum of applications (also referred to as "apps") may be executing on the mobile device 700. The applications may include native applications (e.g., applications programmed in Objective-C running on iOS™ or applications programmed in Java running on Android™), mobile web applications (e.g., HTML5), and/or hybrid applications (e.g., a native shell application that launches an HTML5 session). In a specific example, the mobile device 700 may include a messaging app 720, audio recording app 722, a camera app 724, a book reader app 726, a media app 728, a browser app 730, a file management app 732, a direct app 734, a location app 736, a settings app 738, a contacts app 740, a telephone call app 742, other apps (e.g., gaming apps, social networking apps), and a third party app 744.

Term Usage

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within the scope of embodiments of the present disclosure as represented by the appended claims. The specification and drawings are, accordingly, to be regarded in an illustrative rather than a restrictive sense.

What is claimed is:

1. A character-recognition method for discriminating between a plurality of character classes, the method comprising:

using a processor,
defining a plurality of irregularly sized and positioned sub-regions within an image region of specified image dimensions;
for each of the plurality of character classes, determining a discriminative feature space by
computing, for each of a plurality of training images within a set of training images having the specified image dimensions and being associated with the character class, mid-level features for all of the sub-regions;
computing feature weights for the mid-level features using a machine-learning algorithm applied to the set of training images;
ranking the mid-level features based on the weights; and
selecting a number of top-ranked features for inclusion in the discriminative feature space; and
creating a combined feature space from the discriminative feature spaces for all of the character classes.

2. The method of claim 1, further comprising, for each of the plurality of character classes, computing updated feature weights for all mid-level features within the combined feature space.

3. The method of claim 2, further comprising classifying a scene character based on an image thereof by
computing, from the scene character image, mid-level features for the sub-regions within the combined feature space;
computing, for each of the plurality of character classes, a weighted average of the mid-level features using the updated feature weights; and
comparing the weighted averages computed for the plurality of character classes to identify, among the plurality of character classes, a closest match for the scene character.

4. The method of claim 1, wherein the sub-regions are rectangular and wherein defining the plurality of irregularly sized and positioned sub-regions comprises randomly selecting a position, a width, and a height from respective uniform distributions.

5. The method of claim 1, further comprising, for each of the plurality of training images within the set, computing pixel-wise low-level features, wherein computing the mid-level features comprises aggregating the low-level features over the pixels within each of the sub-regions.

6. The method of claim 1, wherein the mid-level features comprise, for each of the sub-regions, features computed for a plurality of feature channels.

7. The method of claim 6, wherein the feature channels comprise three color channels, six gradient histogram channels, and one gradient-magnitude channel.

8. The method of claim 1, wherein the machine-learning algorithm comprises a supervised learning algorithm.

9. The method of claim 8, wherein the supervised learning algorithm comprises a support vector machine algorithm.

10. The method of claim 1, wherein the plurality of character classes comprises 52 English letter classes and ten number-digit classes.

11. A system comprising:
a plurality of modules, comprising one or more processors, comprising:
a sub-region-selection module configured to define a plurality of irregularly sized and positioned sub-regions within an image region;
a feature-computation module configured to compute, from an input image, mid-level features for each of a specified plurality of sub-regions;
a machine-learning module configured to determine, from mid-level features computed for a plurality of input images of a set of training images associated with a character class, feature weights associated with the character class; and
a feature-selection module configured to rank features for a character class based on the feature weights associated with the class, and to select a number of top-ranked features for inclusion in a discriminative feature space.

12. The system of claim 11, wherein the plurality of modules further comprises:
a training-control module configured to process a plurality of training images associated with a plurality of character classes by
causing the feature-computation module to compute, for each of the training images, mid-level features for each of the sub-regions defined by the sub-region-selection module,
causing the machine-learning module to determine, for each of the character classes, feature weights associated therewith,
causing the feature-selection module to select top-ranked features for inclusion in the discriminative feature space for each of the character classes.

13. The system of claim 12, wherein the training-control module is further configured to cause the machine-learning module to re-determine, for each of the character classes, feature weights for all features included in the discriminated feature space.

14. The system of claim 11, wherein the plurality of modules further comprises:
a character-classification module configured to cause the feature-computation module to compute, from an input image containing a scene character, mid-level features for each of a plurality of sub-regions within the discriminative feature space, and to classify the scene character based on the mid-level features and feature weights associated with the character classes.

15. The system of claim 14, further comprising a camera for acquiring images containing scene characters.

16. The system of claim 11, wherein the sub-region-selection module is configured to define rectangular sub-regions, defining the sub-regions comprising randomly selecting positions, widths, and heights thereof from respective uniform distributions.

17. The system of claim 11, wherein the feature-computation module comprises a low-level-feature-computation module configured to compute pixelwise features for one or more feature channels and a feature-pooling module configured to aggregate the pixelwise features across the specified sub-regions.

18. The system of claim 11, wherein the feature-computation module is configured to compute features for a plurality of feature channels, the channels comprising three color channels, six gradient histogram channels, and a gradient magnitude channel.

19. The system of claim 11, wherein the machine-learning module is configured to implement a support vector machine.

20. A non-transitory machine-readable medium comprising a plurality of machine-executable instructions configured to cause one or more processors to:
define a plurality of irregularly sized and positioned sub-regions within an image region of specified image dimensions;
for each of the plurality of character classes, determine a discriminative feature space by
computing, for each of a plurality of training images within a set of training images having the specified image dimensions and being associated with the character class, mid-level features for all of the sub-regions;

computing feature weights for the mid-level features using a machine-learning algorithm applied to the set of training images;
ranking the mid-level features based on the weights; and
and selecting a number of top-ranked features for inclusion in the discriminative feature space; and
create a combined feature space from the discriminative feature spaces for all of the character classes.

* * * * *

UNITED STATES PATENT AND TRADEMARK OFFICE
CERTIFICATE OF CORRECTION

PATENT NO. : 9,245,191 B2
APPLICATION NO. : 14/479217
DATED : January 26, 2016
INVENTOR(S) : Bhardwaj et al.

Page 1 of 1

It is certified that error appears in the above-identified patent and that said Letters Patent is hereby corrected as shown below:

In the claims,
In column 21, line 5, in Claim 20, before "selecting", delete "and"

Signed and Sealed this
Ninth Day of August, 2016

Michelle K. Lee
*Director of the United States Patent and Trademark Office*